United States Patent
Kitatani et al.

(10) Patent No.: US 10,993,455 B2
(45) Date of Patent: May 4, 2021

(54) POWDERED OIL AND/OR FAT, FOOD AND DRINK CONTAINING POWDERED OIL AND/OR FAT, AND METHOD FOR MANUFACTURING POWDERED OIL AND/OR FAT

(71) Applicant: The Nisshin OilliO Group, Ltd., Tokyo (JP)

(72) Inventors: Yuki Kitatani, Chiba (JP); Takashi Ito, Chiba (JP); Ryuji Noda, Yokosuka (JP)

(73) Assignee: THE NISSHIN OILLIO GROUP, LTD., Tokyo (JP)

( * ) Notice: Subject to any disclaimer, the term of this patent is extended or adjusted under 35 U.S.C. 154(b) by 660 days.

(21) Appl. No.: 15/592,706

(22) Filed: May 11, 2017

(65) Prior Publication Data
US 2017/0245515 A1 Aug. 31, 2017

Related U.S. Application Data

(63) Continuation of application No. PCT/JP2015/081850, filed on Nov. 12, 2015.

(30) Foreign Application Priority Data

Nov. 13, 2014 (JP) .............................. JP2014-230739
Nov. 2, 2015 (JP) .............................. JP2015-215604

(51) Int. Cl.
| | | |
|---|---|---|
| A23D 9/007 | (2006.01) | |
| C11C 3/00 | (2006.01) | |
| A23D 9/02 | (2006.01) | |
| C08L 91/00 | (2006.01) | |

(52) U.S. Cl.
CPC .............. *A23D 9/007* (2013.01); *A23D 9/02* (2013.01); *C08L 91/00* (2013.01); *C11C 3/00* (2013.01)

(58) Field of Classification Search
CPC .. C08L 91/00; C08L 3/02; A23D 9/02; A23D 9/007; C11C 3/00
See application file for complete search history.

(56) References Cited

U.S. PATENT DOCUMENTS

| | | | |
|---|---|---|---|
| 4,737,369 A | 4/1988 | Asano et al. | |
| 2005/0123667 A1* | 6/2005 | Sakuma | A21D 2/16 426/601 |
| 2007/0160674 A1 | 7/2007 | Nakahara et al. | |

FOREIGN PATENT DOCUMENTS

| | | | |
|---|---|---|---|
| CN | 104054849 A | 9/2014 | |
| JP | H06-033087 | 2/1994 | |
| JP | H07-123919 | 5/1995 | |
| JP | H11-318332 | 11/1999 | |
| JP | 2002-188095 | 7/2002 | |
| JP | 2003-073691 | 3/2003 | |
| JP | 2005-168356 | 6/2005 | |
| JP | 2005-263948 | 9/2005 | |
| WO | WO-2009118968 A1 * | 10/2009 | ............... A23G 3/34 |

OTHER PUBLICATIONS

Wang et al., "Physicochemical properties of octenyl succinic anhydride-modified potato starch with different degrees of substitution". Science of Food and Agriculture, vol. 90, Issue 3 (2010) pp. 424-429 (Year: 2010).*
Sweedman et al., "Structure and Physicochemical Properties of Octenyl Succinic Anhydride Modified Starches: A Review". Carbohydrate Polymers 92 (2013) 905-920. (Year: 2013).*
Extended Search Report issued in European Patent Application No. 15859634.6, dated Apr. 3, 2018.
Office Action, dated Feb. 3, 2020, in Chinese Application No. 201580061704.2.
"Preparation and Characterization of Medium Chain Triglyceride Microcapsules", Deng Bo, Chinese Master's Theses Full-Text Database Engineering Science and Technology I, No. 4, B018-18, 2012.

* cited by examiner

*Primary Examiner* — Erik Kashnikow
*Assistant Examiner* — Assaf Zilbering
(74) *Attorney, Agent, or Firm* — Knobbe, Martens, Olson & Bear LLP

(57) ABSTRACT

A powdered oil and/or fat that includes a high proportion of a medium-chain fatty-acid triglyceride, has excellent solubility and fluidity, and gives rise to little oil flotation during dissolution. The powdered oil and/or fat includes a medium-chain fatty-acid triglyceride, an octenylsuccinic acid-treated starch mixture, and a dextrin, in which the octenylsuccinic acid-treated starch mixture includes a first octenylsuccinic acid-treated starch of which the viscosity of a 10 mass % aqueous solution at 25° C. is less than 30 mPa·S, and a second octenylsuccinic acid-treated starch of which the viscosity of a 10 mass % aqueous solution at 25° C. is 30 mPa·S or more; the content of the second octenylsuccinic acid-treated starch is 12-45 mass %, inclusive, relative to the entire octenylsuccinic acid-treated starch mixture; the dextrose equivalent weight of the dextrin is 10 or more; and the content of the medium-chain fatty-acid triglyceride is 65-85 mass %, inclusive, relative to the entire powdered oil and/or fat.

7 Claims, No Drawings

POWDERED OIL AND/OR FAT, FOOD AND DRINK CONTAINING POWDERED OIL AND/OR FAT, AND METHOD FOR MANUFACTURING POWDERED OIL AND/OR FAT

RELATED APPLICATIONS

This application is a continuation of International Application No. PCT/JP2015/081850, filed Nov. 12, 2015, which claims priority to Japanese Patent Application No. 2014-230739, filed Nov. 13, 2014; and Japanese Patent Application No. 2015-215604, filed Nov. 2, 2015, The content of these applications are incorporated herein by reference in their entireties.

TECHNICAL FIELD

The present invention relates to a powdered oil and/or fat, a food and drink containing the powdered oil and/or fat, and a method of manufacturing the powdered oil and/or fat.

BACKGROUND ART

Medium-chain fatty-acid triglyceride shows superior digestion and absorption properties as compared with common vegetable oils, and can be easily used as energy. Therefore, medium-chain fatty-acid triglyceride is used in the medical field for supplying energy to patients with decreased digestion and absorption functions, and for recovering physical strength of patients after operation, and for other purposes. Further, medium-chain fatty-acid triglyceride is also used in the field of food industry for providing the elderly with high-calorie meals. When medium-chain fatty-acid triglyceride is used as an additive for pharmaceutical products, food products, and the like, medium-chain fatty-acid triglyceride may be used as a liquid oil and/or fat, or may be used in a form of a powdered oil and/or fat.

Powdered oils and/or fats are used in a wide variety of fields because of the following advantages: for example, they can be more easily mixed with other powdered raw materials as compared with liquid or solid oils and fats; and further they can be easily dispersed and dissolved in water without need of emulsification. Technologies for preparing powdered oils and/or fats include those described in Patent Documents 1 to 3.

Patent Document 1: Japanese Unexamined Patent Application, Publication No. 2003-73691
Patent Document 2: Japanese Unexamined Patent Application, Publication No. H11-318332
Patent Document 3: Japanese Unexamined Patent Application, Publication No. H06-33087

DISCLOSURE OF THE INVENTION

Problems to be Solved by the Invention

Easy handling and non-disfiguring upon dissolution are required for powdered oils and/or fats, and thus a high solubility and fluidity as power are required, and small oil floating upon dissolution is also required. However, when a large proportion of medium-chain fatty-acid triglyceride is blended with a powdered oil and/or fat according to the conventional technology (for example, 65 mass % or more relative to the whole powdered oil and/or fat), a powdered oil and/or fat having excellent solubility and fluidly with less oil floating upon dissolution may not be obtained.

The present invention is made in view of these situations. An object of the present invention is to provide a powdered oil and/or fat containing a large proportion of medium-chain fatty-acid triglyceride and having excellent solubility and fluidity with less oil floating upon dissolution.

Means for Solving the Problems

The present investors find that the above object can be achieved by blending an octenylsuccinic acid-treated starch mixture containing at least two types of octenylsuccinic acid-treated starch having different viscosity in a specific ratio and dextrin with a dextrose equivalent of 10 or more along with medium-chain fatty-acid triglyceride. Then, the present invention has been completed. Specifically, the present invention can provide the followings.

(1) A powdered oil and/or fat, including medium-chain fatty-acid triglyceride, an octenylsuccinic acid-treated starch mixture, and dextrin, in which the octenylsuccinic acid-treated starch mixture includes a first octenylsuccinic acid-treated starch having a viscosity of less than 30 mPa·s at 25° C. in a 10 mass aqueous solution, and a second octenylsuccinic acid-treated starch having a viscosity of 30 mPa·s or more at 25° C. in a 10 mass % aqueous solution, and the content of the second octenylsuccinic acid-treated starch is 12 mass % or more and 45 mass % or less relative to the total of the octenylsuccinic acid-treated starch mixture, and the dextrose equivalent of the dextrin is 10 or more, and the content of the medium-chain fatty-acid triglyceride is 65 mass % or more and 85 mass % or less relative to the total of the powdered oil and/or fat.

(2) The powdered oil and/or fat according to (1), in which the content of the dextrin is 5.0 mass % or more and 30 mass % or less relative to the total of the powdered oil and/or fat.

(3) The powdered oil and/or fat according to (1) or (2), in which the content of the octenylsuccinic acid-treated starch mixture is 5.0 mass % or more and 20 mass % or less relative to the total of the powdered oil and/or fat.

(4) The powdered oil and/or fat according to any one of (1) to (3), in which the medium-chain fatty-acid triglyceride includes one or more of any of saturated fatty acids with 8, 10, and 12 carbon atoms as constituent fatty acids.

(5) A food or drink including the powdered oil and/or fat according to any one of (1) to (4).

(6) A method of manufacturing a powdered oil and/or fat, the method including the steps of: preparing an oil-in-water emulsion including medium-chain fatty-acid triglyceride, an octenylsuccinic acid-treated starch mixture, dextrin, and water, and drying and powderizing the oil-in-water emulsion to prepare the powdered oil and/or fat, in which the octenylsuccinic acid-treated starch mixture includes a first octenylsuccinic acid-treated starch having a viscosity of less than 30 mPa·s at 25° C. in a 10 mass % aqueous solution, and a second octenylsuccinic acid-treated starch having a viscosity of 30 mPa·s or more at 25° C. in a 10 mass % aqueous solution, and the content of the second octenylsuccinic acid-treated starch is 12 mass % or more and 45 mass % or less relative to the total of the octenylsuccinic acid-treated starch mixture, and the dextrose equivalent of the dextrin is 10 or more, and the content of the medium-chain fatty-acid triglyceride is 65 mass % or more and 85 mass % or less relative to the total of the powdered oil and/or fat.

(7) The method of manufacturing a powdered oil and/or fat according to (6), in which the median diameter of oil droplets of the oil-in-water emulsion is 0.3 μm or more and 1.5 μm or less.

Effects of the Invention

The present invention can provide a powdered oil and/or fat including a large proportion of medium-chain fatty-acid triglyceride and having excellent solubility and fluidity with less oil floating upon dissolution.

PREFERRED MODE FOR CARRYING OUT THE INVENTION

Below, embodiments of the present invention will be described. It should be noted that the present invention shall not be limited to the following embodiments.

[Powdered Oil and/or Fat]

The powdered oil and/or fat according to the present invention contains medium-chain fatty-acid triglyceride, an octenylsuccinic acid-treated starch mixture, and dextrin. The powdered oil and/or fat according to the present invention has a structure in which a fine oil droplet containing medium-chain fatty-acid triglyceride and others is coated with an octenylsuccinic acid-treated starch mixture, dextrin, and the like. Below, each of the components of the powdered oil and/or fat according to the present invention will be described.

(Medium-chain fatty-acid Triglyceride)

Medium-chain fatty-acid triglyceride may also be referred to as MCT (Medium Chain Triglycerides), and includes saturated fatty acids (split fatty acids from coconut oil and the like) having 6 to 12 (preferably 8 to 10) carbon atoms as constituent fatty acids.

Saturated fatty acids having 6 to 12 carbon atoms include n-hexanoic acid, n-heptanoic acid, n-octanoic acid, n-nonoic acid, n-decanoic acid, n-undecanoic acid, and n-dodecanoic acid. Among these, saturated fatty acids having the even number of carbon atoms are preferred, and a combination of any one or more of saturated fatty acids having 8, 10, and 12 carbon atoms (n-octanoic acid, n-decanoic acid, and n-dodecanoic acid) are more preferred, and saturated fatty acids having 8 and/or 10 carbon atoms (n-octanoic acid and/or n-decanoic acid) are even more preferred.

The content of the medium-chain fatty-acid triglyceride in the powdered oil and/or fat is 65 mass % or more and 85 mass % or less relative to the total of the powdered oil and/or fat, preferably 70 mass % or more and 85 mass % or less, and even more preferably 75 mass % or more and 85 mass % or less. Conventionally, a powdered oil and/or fat having excellent solubility and fluidly with less oil floating upon dissolution is difficult to be obtained when the powdered oil and/or fat contains medium-chain fatty-acid triglyceride in an amount as high as 65 mass % or more relative to the total of the powdered oil and/or fat. In contrast, according to the present invention, a powdered oil and/or fat having excellent solubility and fluidly with less oil floating upon dissolution and further capable of conferring rich taste on food products even when it has a large proportion of medium-chain fatty-acid triglyceride can be obtained by blending an octenylsuccinic acid-treated starch mixture and dextrin described below along with the medium-chain fatty-acid triglyceride. When the content of the medium-chain fatty-acid triglyceride in the powdered oil and/or fat is 85 mass % or less relative to the total powdered oil and/or fat, the octenylsuccinic acid-treated starch mixture, dextrin, and the like described below can be blended in amounts sufficient for obtaining their effects.

Oils and/or fats other than medium-chain fatty-acid triglyceride may be blended in the powdered oil and/or fat as long as they do not impair the effect of the present invention. There is no particular limitation for oils and/or fats other than medium-chain fatty-acid triglyceride as long as they are edible oils and/or fats. They include vegetable oils and/or fats (rapeseed oil, corn oil, soybean oil, cotton seed oil, safflower oil, palm oil, rice bran oil, and the like), animal oils and/or fats (beef tallow, lard, milk fat, fish oil, and the like), and hardened oils or transesterified oils thereof, or liquid oils or solid fats obtained by fractionating these oils and/or fats, and the like. These oils and/or fats may be used alone or in combination of two or more.

When oils and/or fats other than medium-chain fatty-acid triglyceride are contained in the powdered oil and/or fat, the contents of these oils and/or fats are preferably 0.0 mass % or more and 10 mass % or less relative to the total of the powdered oil and/or fat, more preferably 0.0 mass % or more and 5.0 mass % or less, and most preferably 0.0 mass % or more and 3.0 mass % or less. The composition according to the present invention is particularly suitable when the oil and/or fat includes medium-chain fatty-acid triglyceride, and thus oils and/or fats other than medium-chain fatty-acid triglyceride are preferably not contained in the powdered oil and/or fat.

When oils and/or fats other than medium-chain fatty-acid triglyceride are contained in the powdered oil and/or fat, the total content of all oils and/or fats in the powdered oil and/or fat (that is, the total amount of medium-chain fatty-acid triglyceride and oils and/or fats other than medium-chain fatty-acid triglyceride) is preferably 65 mass % or more and 85% or less relative to the total of the powdered oil and/or fat, more preferably 70 mass % or more and 85 mass % or less, and most preferably 75 mass % or more and 85 mass % or less.

Medium-chain fatty-acid triglyceride can be manufactured according to the conventionally known method, for example, can be manufactured by subjecting medium-chain fatty acid and glycerin to the esterification reaction according to the conventional method. Medium-chain fatty acid used as a raw material for medium-chain fatty-acid triglyceride may be obtained by, for example, hydrolyzing palm kernel oil, coconut oil, and the like containing medium-chain fatty acid, and then performing purification. As medium-chain fatty-acid triglyceride, a commercially available edible oil and/or fat such as "ODO" (Product name, Nisshin Oillio Group, Ltd.) may be used.

The content of medium-chain fatty-acid triglyceride in a powdered oil and/or fat may be measured by the following method. First, a powdered oil and/or fat is dissolved in boiling water, and oils and/or fats in the powdered oil and/or fat are extracted in accordance with the Roese-Gottlieb method. Then, the composition of triglyceride in the oils and/or fats may be measured by gas chromatography to determine the content of medium-chain fatty-acid triglyceride. As a column which can be used for gas chromatography, for example, a "DB-1ht" from Agilent Technologies can be used.

(Octenylsuccinic Acid-treated Starch Mixture)

The powdered oil and/or fat according to the present invention contains an octenylsuccinic acid-treated starch mixture including a first octenylsuccinic acid-treated starch having a viscosity of less than 30 mPa·s at 25° C. in a 10 mass % aqueous solution, and a second octenylsuccinic acid-treated starch having a viscosity of 30 mPa·s or more at 25° C. in a 10 mass % aqueous solution. The viscosity of the first octenylsuccinic acid-treated starch is preferably 1.0 mPa·s or more and 25 mPa·s or less in a 10 mass % aqueous solution (25° C.), more preferably 2.0 mPa·s or more and 20 mPa·s or less, and most preferably 5.0 mPa·s or more and 10 mPa·s or less. The viscosity of the second octenylsuccinic acid-treated starch is preferably 30 mPa·s or more and 60 mPa·s or less in a 10 mass % aqueous solution (25° C.), more preferably 35 mPa·s or more and 55 mPa·s or less, and most preferably 35 mPa·s or more and 45 mPa·s or less. The viscosity of the octenylsuccinic acid-treated starch mixture is preferably 8.0 mPa·s or more and 14.0 mPa·s or less in a 10 mass % aqueous solution at 25° C.

The content of the second octenylsuccinic acid-treated starch is 12 mass % or more and 45 mass % or less relative to the total of the octenylsuccinic acid-treated starch mixture, preferably 15 mass % or more and 40 mass % or less, more preferably 15 mass % or more and 35 mass % or less, even more preferably 15 mass % or more and 30 mass % or less, and most preferably 20 mass % or more and 25 mass % or less. According to the present invention, a powdered oil and/or fat having a large proportion of medium-chain fatty-acid triglyceride and having excellent solubility and fluidly with less oil floating upon dissolution can be obtained by blending two types of octenylsuccinic acid-treated starch having different viscosity, and further blending the first octenylsuccinic acid-treated starch in an amount larger than the second octenylsuccinic acid-treated starch.

When the blending amount of the second octenylsuccinic acid-treated starch is less than 12 mass % relative to the total of the octenylsuccinic acid-treated starch mixture, emulsification of the powdered oil and/or fat may be unstable. This may tend to deteriorate the fluidity of the powdered oil and/or fat, and also tend to generate more oil floating upon dissolution of the powdered oil and/or fat. When the blending amount of the second octenylsuccinic acid-treated starch is more than 45 mass % relative to the total of the octenylsuccinic acid-treated starch mixture, the viscosity of an oil-in-water emulsion prepared from the powdered oil and/or fat is high. This may tend to reduce productivity or decrease the solubility of the powdered oil and/or fat.

There is no particular limitation for the content of the octenylsuccinic acid-treated starch mixture in a powdered oil and/or fat, but it is preferably 5.0 mass % or more and 20 mass % or less relative to the total of the powdered oil and/or fat, more preferably 7.0 mass % or more and 18 mass % or less, and most preferably 10 mass % or more and 15 mass % or less. When the content of the octenylsuccinic acid-treated starch mixture in a powdered oil and/or fat falls within the above ranges, a powdered oil and/or fat having excellent solubility and fluidity can tend to be obtained.

There is no particular limitation for octenylsuccinic acid-treated starch as long as it satisfies the above requirements, but plant-derived starch (potato starch, tapioca starch, cornstarch, waxy cornstarch, and the like) or those obtained by esterifying hydrolyzed products thereof with octenylsuccinic acid can be preferably used. Octenylsuccinic acid-treated starches obtained via esterification include, for example, those in which one carboxylic acid group in octenylsuccinic acid and starch or hydrolyzed products thereof form an ester. In the octenylsuccinic acid-treated starch having such an ester, the other carboxylic acid group which does not form an ester in the octenylsuccinic acid may be a free group, or may form a salt with sodium, potassium, ammonia, amine, or the like. In view of obtaining the effect of the present invention, the other carboxylic acid group which does not form an ester on the octenylsuccinic acid in the octenylsuccinic acid-treated starch preferably forms a sodium salt (that is, sodium starch octenylsuccinate is preferred). The first octenylsuccinic acid-treated starch and the second octenylsuccinic acid-treated starch may be of the same type, or may be of different types. The first and second octenylsuccinic acid-treated starches each include the same type of starch, but they may be prepared by mixing different types of starch to adjust viscosity.

Methods of adjusting the viscosities of the first and second octenylsuccinic acid-treated starches include a method in which the above starches (or hydrolyzed products of the starches) esterified with octenylsuccinic acid are subjected to acidolysis with hydrochloric acid, sulfuric acid, and the like; enzymatic decomposition with amylase; or other treatments. Further, the viscosities of the first and second octenylsuccinic acid-treated starches may be adjusted by combining two or more starches having viscosities within the ranges of those of the first and second octenylsuccinic acid-treated starches.

The viscosities of the first and second octenylsuccinic acid-treated starches may be determined by the method described in Example.

The followings can be used as the first octenylsuccinic acid-treated starch: "Purity Gum BE" (Product name, Ingredion), "Purity Gum 1773" (Product name, Ingredion), "Capsul" (Product name, Ingredion), "Emalstar A1" (Product name, Matsutani Chemical Industry Co., Ltd.), and "Emalstar 500" (Product name, Matsutani Chemical Industry Co., Ltd.).

Commercially available products such as "N-creamer 46" (Product name, Ingredion) may be used as the second octenylsuccinic acid-treated starch.

The content of the octenylsuccinic acid-treated starch mixture in a powdered oil and/or fat may be determined in accordance with "Sodium starch octenylsuccinate, purity test (1) and (2)" described in the "Specifications and Standards for Foods, Food Additives, etc." (Food Sanitation Act).

(Dextrin)

The powdered oil and/or fat according to the present invention includes dextrin with a dextrose equivalent of 10 or more. The solubility of the powdered oil and/or fat can readily be increased when dextrin as described above is blended in the powdered oil and/or fat. Further, formativity can be improved when dextrin as described above is blended in the powdered oil and/or fat. Further, combined use of dextrin and the aforementioned octenylsuccinic acid-treated starch mixture enables stable preparation of a powdered oil and/or fat having excellent solubility and fluidly with less oil floating upon dissolution even when medium-chain fatty-acid triglyceride is contained in a large proportion.

Particularly in view of obtaining a powdered oil and/or fat having excellent solubility and fluidly with less oil floating upon dissolution, and further controlling the sweetness of the powdered oil and/or fat to prevent deteriorated flavors of other materials, the dextrose equivalent of dextrin is preferably 10 or more and 50 or less, more preferably 10 or more and 40 or less, even more preferably 10 or more and 30 or less, and most preferably 10 or more and 20 or less.

In view of readily obtaining a powdered oil and/or fat having good solubility and fluidly, the content of dextrin in the powdered oil and/or fat is preferably 5.0 mass % or more and 30 mass % or less relative to the total of the powdered oil and/or fat, more preferably 7.0 mass % or more and 20 mass % or less, and most preferably 10 mass % or more and 15 mass % or less.

The term "dextrose equivalent", which may also be referred to as DE (Dextrose Equivalent), is a measure for expressing the degree of hydrolysis of starch. A higher value means a higher degree of hydrolysis. The dextrose equivalent may be determined by measuring reducing sugar in terms of glucose, and calculating a ratio of the reducing sugar to the solid content 100 (dextrose equivalent=direct reducing sugar (expressed in terms of glucose)/solid content×100). The Willstatter-Schudel method may be used as a method of measuring reducing sugar.

There is no particular limitation for a method of manufacturing dextrin, but examples of the method include hydrolysis of plant-derived starch (starch such as rice powder starch, wheat starch, corn starch, potato starch, tapioca starch, sweet potato starch, dogtooth violet starch, and cornstarch) with acid or enzyme.

The content of dextrin in the powdered oil and/or fat may be determined by high performance liquid chromatography.

(Other Raw Materials)

In addition to the above components, a known additive may be contained in the powdered oil and/or fat according to the present invention as long as it does not impair the effect of the present invention. The identity and blending amount thereof can be appropriately adjusted depending on the desired effect. Further, a small amount of water as low as less than 3.0 mass % may be contained in the powdered oil and/or fat according to the present invention relative to the total of the powdered oil and/or fat. Known additives include saccharides (for example, lactose, sucrose, glucose, and the like), vitamins (for example, vitamin C, vitamin E, and the like), polysaccharide thickeners (for example, gelatin, xanthan gum, gum arabic, gellan gum, locust bean gum, tamarind seed gum, carrageenan, agar, pectin, and the like), micronutrients (for example, calcium, potassium, magnesium, iron, zinc, and the like), anti-oxidants, flavoring agents, and the like.

When lactose is blended in the powdered oil and/or fat containing a large proportion of medium-chain-fatty-acid triglyceride (for example, 65 mass % or more relative to the total of the powdered oil and/or fat), the solubility of the powdered oil and/or fat tends to be decreased. Therefore, lactose is not preferably contained in the powdered oil and/or fat according to the present invention.

The powdered oil and/or fat according to the present invention may contain at least medium-chain-fatty-acid triglyceride, an octenylsuccinic acid-treated starch mixture, and dextrin as raw materials. The conventional powdered oils and/or fats may include protein (casein and the like) as an excipient. According to the present invention, a powdered oil and/or fat showing less oil floating upon dissolution can, however, be obtained even though protein is not included. Therefore, the powdered oil and/or fat according to the present invention prepared with no or little protein can be conveniently used for acidic food products (yogurt, vegetable beverage, and the like) which may cause aggregation of protein, and food products for patients with kidney disease who are under restriction of protein intake.

[Method of Manufacturing Powdered Oil and/or Fat]

The powdered oil and/or fat according to the present invention may be obtained by drying and powderizing an oil-in-water emulsion containing the aforementioned components (medium-chain-fatty-acid triglyceride, an octenylsuccinic acid-treated starch mixture, dextrin, and the like).

The oil-in-water emulsion can be obtained according to the known method of preparing an emulsion. For example, an aqueous phase obtained by dissolving an octenylsuccinic acid-treated starch mixture and dextrin in water are mixed with an oil phase containing medium-chain-fatty-acid triglyceride, and stirred with a homomixer and the like, and then homogenized with a homogenizer and the like, thereby obtaining the oil-in-water emulsion.

The viscosity of the oil-in-water emulsion is preferably 1200 mPa·s or less, more preferably 1000 mPa·s or less. The viscosity of the oil-in-water emulsion may be determined with a Brookfield viscometer (a rotor No. 1 is used at 55° C. and 20 rpm, but, a rotor No. 2 is used for above 500 mPa·s).

There is no particular limitation for the median diameter of oil droplets of the oil-in-water emulsion, but it is preferably 0.3 µm or more and 1.5 µm or less, more preferably 0.5 µm or more and 1.0 µm or less, and most preferably 0.6 µm or more and 0.8 µm or less in view of readily obtaining a powdered oil and/or fat showing less oil floating upon dissolution. The median diameter of oil droplets of the oil-in-water emulsion may be determined by measurements with a laser diffraction particle size distribution analyzer as described in Example.

Drying and powderizing an oil-in-water emulsion may be performed by the known method such as the spray drying method, the freeze-drying method, and the vacuum drying method. The spray drying method is preferred in view of readily obtaining a powdered oil and/or fat.

[Use of Powdered Oil and/or Fat]

The powdered oil and/or fat according to the present invention can be suitably used as a raw material for common food and drink (bread, Japanese-style confectionery, western-style confectionery, household dishes, fry, soup, beverage, fish paste, mixed powder, and the like), seasonings, health food, care food (in particular, food products for patients with kidney disease), and the like, or as an additive for adding to these food products upon consumption. In particular, the powdered oil and/or fat according to the present invention, which does not necessarily need to include protein, can be suitably used for food products for patients with kidney disease and acidic food products. Further, the powdered oil and/or fat according to the present invention can be consumed directly or after dissolution in water and the like.

[Properties of Powdered Oil and/or Fat]

The powdered oil and/or fat according to the present invention has excellent solubility and fluidity with less oil floating upon dissolution even though a large proportion of medium-chain fatty-acid triglyceride is contained. As used in the present invention, the term "solubility" of a powdered oil and/or fat refers to how easy the powdered oil and/or fat dissolves in water. As used in the present invention, the term "fluidity" of a powdered oil and/or fat refers to how easy the powdered oil and/or fat flows as a powder. As used in the present invention, the term "oil floating upon dissolution" means that oil will float on the surface of an aqueous solution when a powdered oil and/or fat is dissolved in warm water.

The solubility, fluidity, and oil floating upon dissolution are evaluated by the methods as described in Example.

EXAMPLES

Below, the present invention will be described in more detail with reference to Example, but the present invention shall not be limited to these.

[Preparation of Powdered Oil and/or Fat]

Each of the oils and fats shown in Tables 1 and 2 was heated to 70° C. to prepare an oil phase. Octenylsuccinic acid-treated starch, dextrin, and lactose were dissolved in the same mass of water as the total mass of each oil and/or fat, each octenylsuccinic acid-treated starch, each dextrin, and lactose shown in Tables 1 and 2 to prepare an aqueous phase. Subsequently, the aqueous phase and the oil phase were mixed, and then homogenized at a pressure of 150 kg/cm$^2$ using a pressure-type homogenizer to obtain an oil-in-water emulsion. The resulting oil-in-water emulsion was spray dried with a nozzle-type spray dryer to obtain a powdered oil and/or fat having 1.8 mass % of water. It is noted that the inlet temperature of air for spray drying was set at 210° C. in the spray drying.

The details of each oil and/or fat shown in Tables 1 and 2 are as follows.

Oil and/or fat A: medium-chain fatty-acid triglyceride 1 (Product name "ODO", constituent fatty acids: n-octanoic acid/n-decanoic acid=3/1 (n-octanoic acid: 75 mass %, n-decanoic acid: 25 mass %); solidifying point: approx. −5° C.; Nisshin Oillio Group, Ltd.)

Oil and/or fat B: soybean oil (product name "Soybean Sirasimeyu", Nisshin Oillio Group, Ltd.)

Oil and/or fat C: hardened rapeseed oil (melting points: 36° C., Miyoshi Oil & Fat Co., Ltd.)

Oil and/or fat D: medium-chain fatty-acid triglyceride 2 (constituent fatty acids: n-octanoic acid 40 mass %, n-decanoic acid 40 mass %, and n-dodecanoic acid 20 mass %, Nisshin Oillio Group, Ltd.)

The details of each octenylsuccinic acid-treated starch shown in Tables 1 and 2 are as follows. The viscosity of each octenylsuccinic acid-treated starch was determined as a viscosity as measured at 25° C. in a 10 mass % solution at 30 seconds after the start of the measurement with a vibratory viscometer (Product name "VIBRO VISCOMETER SV-10", A&D Company Limit). It is noted that sodium starch octenylsuccinates A, B, and C each correspond to the "first octenylsuccinic acid-treated starch", and sodium starch octenylsuccinate D corresponds to the "second octenylsuccinic acid-treated starch."

Sodium starch octenylsuccinate A (viscosity 2.22 mPa·s, Product name "Emalstar A1", Matsutani Chemical Industry Co., Ltd)

Sodium starch octenylsuccinate B (viscosity 2.34 mPa·s, Product name "Capsul", Ingredion)

Sodium starch octenylsuccinate C (viscosity 7.14 mPa·s, Product name "Purity Gum BE", Ingredion)

Sodium starch octenylsuccinate D (viscosity 38.7 mPa·s, Product name "N-creamer 46", Ingredion)

The details of each dextrin shown in Tables 1 and 2 are as follows.

Dextrin A (dextrose equivalent=8, Product name "Pinedex #1", Matsutani Chemical Industry Co., Ltd.)

Dextrin B (dextrose equivalent=11, Product name "Pinedex #2", Matsutani Chemical Industry Co., Ltd.)

Dextrin C (dextrose equivalent=18, Product name "TK-16," Matsutani Chemical Industry Co., Ltd.)

Dextrin D (dextrose equivalent=40, Product name "Pinedex #6," Matsutani Chemical Industry Co., Ltd.)

Dextrin E (dextrose equivalent=45, Product name "MR25-45" Shikishima Starch MFG. Co., Ltd.)

Dextrin F (dextrose equivalent=50, Product name "Sunmalt S", Sanwa Starch Co., Ltd.)

The details of lactose shown in Tables 1 and 2 are as follows.

Lactose (Product name "America grande lactose 80 mesh", Grande Custom Ingredients)

It is noted that the "proportion of sodium starch octenylsuccinate D" in Tables 1 and 2 refers to a proportion of sodium starch octenylsuccinate D relative to the "amount of an octenylsuccinic acid-treated starch mixture."

[Test 1: Evaluation of Powdered Oil and/or Fat]

The properties of the oil-in-water emulsions or powdered oils and/or fats obtained were evaluated according to the method described below.

(Viscosity of Oil-in-water Emulsion)

The viscosity of each oil-in-water emulsion was measured using a Brookfield viscometer (Nihon Keiki Co., Ltd.) under conditions of a rotation speed of 20 rpm with a rotor No. 1 or No. 2 (a rotor No. 2 was used when the viscosity was higher than 500 mPa·s) at a temperature of 55° C. for 30 seconds. Results are shown in the row of "viscosity of emulsion before spray drying" in Tables 1 and 2.

(Median Diameter of Oil Droplets of Oil-in-water Emulsion)

The median diameter of oil droplets of an oil-in-water emulsion was measured using a SALD-2100 wet laser diffractometer from Shimadzu Corporation to determine the median diameter of oil droplets of the oil-in-water emulsion. Results are shown in the raw of "Median diameter of emulsion particles" in Tables 1 and 2.

(Solubility)

A powdered oil and/or fat in an amount of 6 g was added to 194 g of water at 20° C., and stirred at 350 rpm for 1 minute with a Three one motor. Then, the amount of undissolved material was visually inspected, and the solubility of the powdered oil and/or fat was evaluated in accordance with the following criteria. Results are shown in the raw of "Solubility" in Tables 1 and 2.

3 points: almost no undissolved powdered oil and/or fat is observed.

2 points: less undissolved powdered oil and/or fat is observed.

1 point: more undissolved powdered oil and/or fat melts is observed.

0 point: significant undissolved powdered oil and/or fat is observed.

(Fluidity)

A powdered oil and/or fat in an amount of 10 g was charged into a Powder consultant (Tsutsui Scientific Instruments Co., Ltd.), and allowed to fall down to the base about 15 cm below with vibration. The outflow conditions of the powdered oil and/or fat was visually inspected to evaluate the fluidity of the powdered oil and/or fat in accordance with the following criteria. Results are shown in the raw of "fluidity" in Tables 1 and 2.

3 points: outflow is smooth, and fluidity is also good.

2 points: outflow of a powdered oil and/or fat is more or less smooth, and fluidity is also good.

1 point: outflow of a powdered oil and/or fat is not smooth, and fluidity is also slightly bad.

0 point: outflow of a powdered oil and/or fat is significantly non-smooth, and fluidity is also bad.

(Oil Floating Upon Dissolution)

A powdered oil and/or fat in an amount of 3 g was added to 27 g of warm water at 60° C., and conditions of oil which floated on the surface of an aqueous solution were visually inspected stirring and dissolving with a medicine spoon to evaluate oil floating upon dissolution of the powdered oil and/or fat in accordance with the following criteria. Results are shown in the raw of "Oil floating upon dissolution" in Tables 1 and 2.

3 points: No oil floating is observed.

2 points: less oil floating is observed.

1 point: more oil floating is observed.

0 point: significant oil floating is observed.

(Overall Evaluation)

The evaluation scoring points of solubility, fluidity, and oil floating upon dissolution were summed together. Based on that value, the overall evaluation of the powdered oil and/or fat was performed in accordance with the following criteria. Results are shown in the raw of "Evaluation results"

in Tables 1 and 2. It is noted that the evaluation scoring point was shown together in the parenthesis when the evaluation was "Good".
Good: The sum total of the evaluation scoring points of solubility, fluidity, and oil floating upon dissolution is 6 points or more.

Poor: The sum total of the evaluation scoring points of solubility, fluidity, and oil floating upon dissolution is 5 points or less, or any of the evaluation scoring points of solubility, fluidity, and oil floating upon dissolution is 0 point.

TABLE 1

|  |  | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|
| Oil and/or fat (Mass %) | A | 75 | 75 | 75 | 75 | 75 | 75 | 75 | 75 | 75 | 75 | 75 | — |
|  | B | — | — | — | — | — | — | — | — | — | — | — | — |
|  | C | — | — | — | — | — | — | — | — | — | — | — | — |
|  | D | — | — | — | — | — | — | — | — | — | — | — | 75 |
| Octenyl Succinic acid-treated starch (Mass %) | A | — | 5 | — | — | — | — | — | — | — | — | — | — |
|  | B | 13 | — | — | — | — | — | — | — | — | — | — | — |
|  | C | — | 7.5 | 8 | 7.5 | 7.5 | 7.5 | 6 | 7.5 | 7.5 | 7.5 | 6.2 | 8 |
|  | D | 2 | 2.5 | 2 | 2.5 | 2.5 | 2.5 | 4 | 2.5 | 2.5 | 2.5 | 3.8 | 2 |
| Dextrin (Mass %) | A | — | — | — | — | — | — | — | — | — | — | — | — |
|  | B | — | — | — | — | 15 | — | — | — | — | — | — | — |
|  | C | 10 | 10 | 15 | 15 | — | — | 15 | — | — | 3 | 3 | 15 |
|  | D | — | — | — | — | — | 15 | — | — | — | — | — | — |
|  | E | — | — | — | — | — | — | — | 15 | — | — | — | — |
|  | F | — | — | — | — | — | — | — | — | 15 | — | — | — |
| Lactose (Mass %) |  | — | — | — | — | — | — | — | — | — | 12 | 12 | — |
| Sum total (Mass %) |  | 100.0 | 100.0 | 100.0 | 100.0 | 100.0 | 100.0 | 100.0 | 100.0 | 100.0 | 100.0 | 100.0 | 100.0 |
| Amount of octenyl succinic acid-treated starch mixture (Mass %) |  | 15 | 15 | 10 | 10 | 10 | 10 | 10 | 10 | 10 | 10 | 10 | 10 |
| Proportion of sodium starch octenyl succinate D (Mass %) |  | 13.3 | 16.7 | 20.0 | 25.0 | 25.0 | 25.0 | 40.0 | 25.0 | 25.0 | 25.0 | 38.0 | 20.0 |
| Viscosity of emulsion before spray drying (mPa·s) |  | 560 | 790 | 600 | 940 | 810 | 700 | 1160 | 824 | 990 | 790 | 990 | 423 |
| Median diameter of emulsion particles (μm) |  | 0.79 | 0.78 | 0.66 | 0.77 | 0.71 | 0.71 | 0.72 | 0.67 | 0.70 | 0.71 | 0.70 | 0.89 |
| Solubility |  | 3 | 3 | 3 | 3 | 2 | 2 | 1 | 3 | 3 | 1 | 1 | 3 |
| Fluidity |  | 3 | 3 | 3 | 3 | 3 | 2 | 3 | 1 | 1 | 3 | 3 | 3 |
| Oil floating upon dissolution |  | 1 | 2 | 3 | 3 | 3 | 2 | 3 | 2 | 2 | 3 | 3 | 3 |
| Overall evaluation |  | Good(7) | Good(8) | Good(9) | Good(9) | Good(8) | Good(6) | Good(7) | Good(6) | Good(6) | Good(7) | Good(7) | Good(9) |

TABLE 2

|  |  | Comparative Example 1 | Comparative Example 2 | Comparative Example 3 | Comparative Example 4 | Comparative Example 5 | Comparative Example 6 |
|---|---|---|---|---|---|---|---|
| Oil and/or fat (Mass %) | A | 75 | 75 | 75 | 75 | — | — |
|  | B | — | — | — | — | 75 | — |
|  | C | — | — | — | — | — | 75 |
| Octenylsuccinic acid-treated starch (Mass %) | A | — | — | — | — | — | — |
|  | B | — | 13.5 | — | — | — | — |
|  | C | 15 | — | 5 | 10 | 7.5 | 7.5 |
|  | D | — | 1.5 | 5 | 5 | 2.5 | 2.5 |
| Dextrin (Mass %) | A | — | — | — | 10 | — | — |
|  | B | 10 | — | — | — | — | — |
|  | C | — | 10 | 15 | — | 15 | 15 |
|  | D | — | — | — | — | — | — |

TABLE 2-continued

|  | Comparative Example 1 | Comparative Example 2 | Comparative Example 3 | Comparative Example 4 | Comparative Example 5 | Comparative Example 6 |
|---|---|---|---|---|---|---|
| E | — | — | — | — | — | — |
| F | — | — | — | — | — | — |
| Lactose (Mass %) | — | — | — | — | — | — |
| Sum total (Mass %) | 100.0 | 100.0 | 100.0 | 100.0 | 100.0 | 100.0 |
| Amount of octenylsuccinic acid-treated starch mixture (Mass %) | 15 | 15 | 10 | 15 | 10 | 10 |
| Proportion of sodium starch octenylsuccinate D (Mass %) | 0.0 | 10.0 | 50.0 | 33.3 | 25.0 | 25.0 |
| Viscosity of emulsion before spray drying (mPa·s) | 800 | 390 | 1320 | 1196 | 500 | 344 |
| Median diameter of emulsion particles (μm) | 0.66 | 0.80 | 0.75 | 0.83 | 1.11 | 1.30 |
| Solubility | 0 | 3 | 0 | 0 | 2 | 2 |
| Fluidity | 2 | 3 | 3 | 2 | 0 | 3 |
| Oil floating upon dissolution | 3 | 0 | 3 | 3 | 0 | 0 |
| Overall evaluation | Poor | Poor | Poor | Poor | Poor | Poor |

As shown in Table 1, the powdered oils and/or fats according to the present invention showed excellent solubility and fluidity, and less oil floating upon dissolution. In particular, when dextrin with a dextrose equivalent of 11 or 18 was used, particularly good results were obtained (Examples 1 to 5, 7, and 12). Further, when the "proportion of sodium starch octenylsuccinate D" (this value corresponds to the content of the second octenylsuccinic acid-treated starch relative to the total of the octenylsuccinic acid-treated starch mixture.) was in the range of 16.7 mass % or more and 25.0 mass % or less, notably good results were obtained (Examples 2 to 5, 12).

When lactose was contained in the composition of a powdered oil and/or fat, solubility tended to be inferior (Examples 10 to 11).

In contrast, as shown in Table 2, when the "proportion of sodium starch octenylsuccinate D" was not in the range according to the present invention (Comparative Examples 1 to 3), or when the dextrose equivalent of dextrin was not in the range according to the present invention (Comparative Example 4), any of solubility, fluidity, and oil floating upon dissolution was significantly inferior.

When the oil and/or fat was not medium-chain fatty-acid triglyceride (Comparative Examples 5 and 6), any of solubility, fluidity, and oil floating upon dissolution was notably inferior even if other conditions satisfied the requirements of the present invention. The results indicate that the composition according to the present invention particularly shows good results when the oil and/or fat includes medium-chain fatty-acid triglyceride.

[Test 2: Addition of Powdered Oil and/or Fat to Yogurt and Evaluation]

When 6 g of the powdered oil and/or fat from Example 3 was added to 70 g of commercially available yogurt (pH=4), and mixed with a spoon, the powdered oil and/or fat did not form lumps, but was rapidly dispersed in yogurt, and oil floating was not observed. The resulting yogurt had a richer taste without impairing the original flavor of yogurt.

[Test 3: Addition of Powdered Oil and/or Fat to Miso Soup and Evaluation]

When 6 g of the powdered oil and/or fat from Example 3 was added to one portion (160 mL) of commercially available instant miso soup, and mixed with a spoon, the powdered oil and/or fat was rapidly dissolved in the miso soup, and neither undissolved materials nor oil floating was observed. The resulting miso soup had a richer taste without impairing the original flavor of the miso soup.

What is claimed is:

1. A powdered oil and/or fat, comprising medium-chain fatty-acid triglyceride, an octenylsuccinic acid-treated starch mixture, and dextrin,
    wherein the octenylsuccinic acid-treated starch mixture comprises a first octenylsuccinic acid-treated starch having a viscosity of less than 30 mPa·s at 25° C. in a 10 mass % aqueous solution, and a second octenylsuccinic acid-treated starch having a viscosity of 30 mPa·s or more at 25° C. in a 10 mass % aqueous solution, and
    the content of the second octenylsuccinic acid-treated starch is 12 mass % or more and 45 mass % or less relative to the total of the octenylsuccinic acid-treated starch mixture, and
    the dextrose equivalent of the dextrin is 10 or more, and the content of the medium-chain fatty-acid triglyceride is 65 mass % or more and 85 mass % or less relative to the total of the powdered oil and/or fat,
    wherein the medium-chain fatty-acid triglyceride comprises one or more of any of saturated fatty acids with 8, 10, and 12 carbon atoms as constituent fatty acids.

2. The powdered oil and/or fat according to claim 1, wherein the content of the dextrin is 5.0 mass % or more and 30 mass % or less relative to the total of the powdered oil and/or fat.

3. The powdered oil and/or fat according to claim 2, wherein the content of the octenylsuccinic acid-treated starch mixture is 5.0 mass% or more and 20 mass% or less relative to the total of the powdered oil and/or fat.

4. A food or drink comprising the powdered oil and/or fat according to claim 3.

5. A method of manufacturing a powdered oil and/or fat according to claim 1, the method comprising the steps of:
preparing an oil-in-water emulsion including medium-chain fatty-acid triglyceride, an octenylsuccinic acid-treated starch mixture, dextrin, and water, and
drying and powderizing the oil-in-water emulsion to prepare the powdered oil and/or fat,
wherein the octenylsuccinic acid-treated starch mixture comprises a first octenylsuccinic acid-treated starch having a viscosity of less than 30 mPa·s at 25° C. in a 10 mass % aqueous solution, and a second octenylsuccinic acid-treated starch having a viscosity of 30 mPa·s or more at 25° C. in a 10 mass % aqueous solution, and the content of the second octenylsuccinic acid-treated starch is 12 mass % or more and 45 mass % or less relative to the total of the octenylsuccinic acid-treated starch mixture, and
the dextrose equivalent of the dextrin is 10 or more, and the content of the medium-chain fatty-acid triglyceride is 65 mass % or more and 85 mass % or less relative to the total of the powdered oil and/or fat.

6. The method of manufacturing a powdered oil and/or fat according to claim 5, wherein the median diameter of oil droplets of the oil-in-water emulsion is 0.3 μm or more and 1.5 μm or less.

7. The powdered oil and/or fat according to claim 1, wherein the content of the medium-chain fatty-acid triglyceride is 70 mass % or more relative to the total of the powdered oil and/or fat.

* * * * *